United States Patent [19]

Rowlette et al.

[11] Patent Number: 4,547,443
[45] Date of Patent: Oct. 15, 1985

[54] UNITARY PLATE ELECTRODE

[75] Inventors: John J. Rowlette, Monrovia; Thomas J. Clough, Woodland Hills; Jack Y. Josefowicz, Westlake Village; John W. Sibert, Venice, all of Calif.

[73] Assignees: Atlantic-Richfield Company, Los Angeles; California Institute of Technology, Pasadena, both of Calif.

[21] Appl. No.: 551,202

[22] Filed: Nov. 14, 1983

[51] Int. Cl.⁴ .............................................. H01M 4/62
[52] U.S. Cl. ................................... 429/217; 429/228
[58] Field of Search ......... 429/210, 212, 217, 225–228

[56] References Cited

U.S. PATENT DOCUMENTS

| | | | |
|---|---|---|---|
| 3,202,545 | 8/1965 | Emeriat | 429/212 |
| 3,466,193 | 9/1969 | Hughel | 429/211 |
| 3,738,871 | 6/1973 | Scholle | 429/241 X |
| 3,819,412 | 6/1974 | Taylor et al. | 429/210 |
| 4,098,967 | 7/1978 | Biddick et al. | 429/210 |
| 4,125,680 | 11/1978 | Shropshire et al. | 429/210 X |
| 4,275,130 | 6/1981 | Rippel et al. | 429/210 X |
| 4,326,017 | 4/1982 | Will | 429/228 |
| 4,339,322 | 7/1982 | Balko | 429/210 X |

Primary Examiner—Charles F. LeFevour
Attorney, Agent, or Firm—Marvin E. Jacobs

[57] ABSTRACT

The unitary electrode (10) comprises a porous sheet (12) of fiberglass the strands (14) of which contain a coating (16) of conductive tin oxide. The lower portion of the sheet contains a layer (18) of resin and the upper layer (20) contains lead dioxide forming a positive active electrode on an electrolyte-impervious layer. The strands (14) form a continuous conduction path through both layers (16, 18). Tin oxide is prevented from reduction by coating the surface of the plate facing the negative electrode with a conductive, impervious layer resistant to reduction such as a thin film (130) of lead or graphite filled resin adhered to the plate with a layer (31) of conductive adhesive. The plate (10) can be formed by casting a molten resin from kettle (60) onto a sheet of glass wool (56) overlying a sheet of lead foil and then applying positive active paste from hopper (64) into the upper layer (68). The plate can also be formed by passing an assembly of a sheet (80) of resin, a sheet (86) of sintered glass and a sheet (90) of lead between the nip (92) of heated rollers (93, 95) and then filling lead oxide into the pores (116) of the upper layer (118).

18 Claims, 5 Drawing Figures

UNITARY PLATE ELECTRODE

DESCRIPTION

Origin of the Invention

The invention described herein was made in the performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates to secondary batteries of the bipolar plate type and, more particularly, to an improved lightweight battery plate for use in lead-acid batteries.

BACKGROUND ART

Even though there has been considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military. These batteries may be periodically charged from a generator.

The conventional lead-acid battery is a multicell structure. Each cell contains a plurality of vertical positive and negative plates formed of lead-based alloy grids containing layers of electrochemically active pastes. This battery has been widely used in the automotive industry for many years, and there is substantial experience and tooling in place for manufacturing this battery and its components. The battery is based on readily available materials, is inexpensive to manufacture and is widely accepted by consumers.

The open circuit potential developed between each positive and negative plate is about 2 volts. Since the plates are connected in parallel, the combined potential for each cell will also be about 2 volts regardless of the number of plates utilized in the cell. One or more cells are then connected in series to provide a battery of desired voltage. The bus bars and top straps used for intercell connection add to the weight and the cost of the battery and often are subject to atmospheric or electrochemical corrosion at or near the terminals.

Another problem with lead-acid batteries is their limited lifetime due to shedding of the active materials from the vertically oriented positive and negative plates. After a period of operation, sufficient flakes accumulate to short circuit the grids resulting in a dead battery cell and shortened battery life.

Lead-acid batteries are inherently heavy due to use of the heavy metal lead in constructing the plates. Modern attempts to produce lightweight lead-acid batteries, especially in the aircraft, electric car and vehicle fields, have placed their emphasis on producing thinner plates from lighter weight materials used in place of and in combination with lead. The thinner plates allow the use of more plates for a given volume, thus increasing the power density. Higher voltages are provided in a bipolar battery including bipolar plates capable of through-plate conduction to serially connect electrodes or cells. Horizontal orientation of the grids prevents the accumulation of flake lead compounds at the battery bottom. Downward movement of electrolyte can be blocked by use of porous glass mats to contain the electrolyte. Also stratification of electrolyte is prevented since the electrolyte is confined and contained within the acid resistant mats by capillary action.

The bipolar plates must be impervious to electrolyte and be electrically conductive to provide a serial connection between electrodes. The bipolar plates also provide a continuous surface to prevent sluffing off of active materials from the grids. Most prior bipolar plates have utilized metallic substrates such as lead or lead alloys. The use of lead alloys, such as antimony, gives strength to the substrate but causes increased corrosion and gassing. Alternate approaches have included plates formed by dispersing conductive particles or filaments such as carbon, graphite or metal in a resin binder.

Some more recent examples of batteries containing bipolar plates are U.S. Pat. No. 4,275,130 in which the biplate construction comprises a thin composite of randomly oriented conductive graphite, carbon or metal fibers imbedded in a resin matrix with strips of lead plated on opposite surfaces thereof. Ser. No. 279,841, filed July 2, 1981, discloses a biplate formed of a thin sheet of titanium covered with a conductive, protective layer of epoxy resin containing graphite powder.

It has been attempted to increase the conductivity and strength of bipolar plates by adding a conductive filler such as graphite. Graphite has been used successfully as a conductive filler in other electrochemical cells, such as in the manganese dioxide, positive active paste of the common carbonzinc cell, and it has been mixed with sulfur in sodium-sulfur cells. However, even though graphite is usually a fairly inert material, it is oxidized in the agressive electrochemical environment of the positive plates in the lead-acid cell to acetic acid. The acetate ions combine with the lead ion to form lead acetate, a weak salt readily soluble in the sulfuric acid electrolyte. This reaction depletes the active material from the paste and ties up the lead as a salt which does not contribute to production or storage of electricity. Acetic acid also attacks the lead grids of the positive electrodes during charge ultimately causing them to disintegrate. Highly conductive metals such as copper or silver are not capable of withstanding the high potential and strong acid environment present at the positive plate of a lead-acid battery. A few electrochemically inert metals such as platinum are reasonably stable. But the scarcity and high cost of such metals prevent their use in high volume commercial applications such as the lead-acid battery. Platinum would be a poor choice even if it could be afforded, because of its low gassing over-potentials.

A low cost, lightweight stable bipolar plate is disclosed in copending application Ser. No. 346,414, filed Feb. 18, 1982, for BIPOLAR BATTERY PLATE. The plate is produced by placing lead pellets into apertures formed in a thermoplastics sheet and rolling or pressing the sheet with a heated platen to compress the pellets and seal them into the sheet. This method involves several mechanical operations and requires that every aperture be filled with a pellet before heating and pressing in order to form a fluid impervious plate. An improved, stable bipolar plate containing a dispersion of conductive tin oxide in resin is disclosed in application Ser. No. 550,875, filed concurrently herewith.

Another limitation on the service life of lead-acid batteries is that during discharge, the lead dioxide (a fairly good conductor) in the positive plate is converted to lead sulfate, an insulator. The lead sulfate can form a thin, impervious layer encapsulating the lead dioxide particles which limits the utilization to less than 50% of capacity, typically around 30%. Furthermore, the lead sulfate can grow into large, hard, angular crystals, disrupting the layer of paste on the grid resulting in flaking and shedding of active material from the grid. Power consumption during charge is also increased due to the presence of lead sulfate insulator. Even when very thin pastes are utilized, the coating of insulating lead sulfate interferes with power output.

An apparent solution to this problem would be the addition of a conductive filler to the paste. The filler must be thermodynamically stable to the electrochemical environment of the cell, both with respect to oxidation and reduction at the potential experienced during charge and discharge of the cell, and to attack by the acid. As previously discussed, a conductive filler such as graphite can not be utilized since graphite is not thermodynamically stable in the oxidizing environment of the positive electrode.

An improved lead-acid paste containing conductive tin oxide is disclosed in copending application Ser. No. 488,199, filed Apr. 25, 1983. The positive active material retains conductivity during both charge and discharge cycles, and the power output of the battery is more uniform since it is less dependent on the state-of-charge and more nearly approaches theoretical efficiency.

The paste does not have good structural strength by itself. A grid or other reinforcement such as a sheet of glass scrim is utilized to provide structural integrity for the layer of cured paste. The interface between the paste and a through-conductive plate, especially a composite plate of resin and filler, introduces resistance into the cell and battery. Furthermore, the plate and the paste require separate manufacturing steps and assembly to form a bipolar plate assembly.

STATEMENT OF THE INVENTION

A unitary battery electrode is provided in accordance with the present invention. The positive active layer has a continuous conduction path from the front surface of the layer to the rear surface of the central, conductive plate. The electrode can be manufactured in an efficient, continuous process which can include simultaneous application of a barrier, reduction resistant layer to form a bipolar plate assembly. The barrier layer for the negative electrode such as lead foil can be adhered directly to the central plate without the need to utilize conductive adhesive.

The plate of this invention includes a continuous network of conductive filler which extends into both the positive active layer and the central conductive plate. In one preferred embodiment, the present plate is prepared utilizing a porous layer of conductive filler having a thickness at least equal to the combined thicknesses of the central, fluid-impervious plate and of the positive layer. This provides a continuous through-conduction path. Furthermore, the porous layer of filler lends itself to ready conversion to an electrode by casting or roll molding techniques. The filler can be fibrous or particulate. The filler is preferably conductive tin oxide coated onto a substrate such as glass in fiber or powder form. The conductively coated filler is preferably formed into a self-sustaining porous sheet such as a sintered mat, fibrous glass wool or woven or unwoven fabric of monofilament or multifilament yarns.

In the casting technique, a liquid resin is filled into the lower portion of the porous sheet of filler and cured by hardening or curing. Positive active paste is then filled into the pores of the upper layer and cured. A sheet of lead or graphite filled plastic may be positioned in the bottom of the casting cavity during casting and will adhere to the bottom edge of the sheet after cure.

The electrode can also be manufactured by simultaneously feeding a sheet of porous conductive filler, a sheet of softened thermoplastic resin and a sheet of lead foil to the nip of a pair of heated rollers which press the sheet of resin into the lower portion portion of the sheet of filler and adhere the lead foil to the assembly. After setting the resin by cooling, the upper portion is filled with positive active paste and cured as discussed above. The bipolar sheet can be cut into lengths for use as bipolar electrode assemblies.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
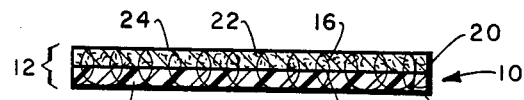
FIG. 1 is a view in section of a battery electrode carrying a single layer of electrolytically active material in accordance with this invention.

An improved, lightweight, unitary battery plate is provided by the present invention that is resistant to the electrochemical environment of the cell. The plate is prepared in a simple, reliable manner to form a low-resistance, fluid-impervious, through-conductive plate containing a porous body of conductive filler having the lower portion filled with resin and the upper portion extending into a layer of battery paste.

The battery plate of the invention contains a conductive filler that is thermodynamically stable to the electrochemical environment of the positive electrode of the lead-acid cell, both with respect to the strong sulfuric acid electrolyte and to species generated under oxidation and reduction conditions experienced during charge and discharge of the battery paste.

A preferred conductivity additive for the battery plate of the present invention is conductive tin dioxide ($SnO_2$). $SnO_2$ can be present as a powder or coated onto a particulate or fibrous substrate such as glass powder or glass wool, as disclosed in copending application Ser. No. 488,199, filed Apr. 25, 1983, entitled IMPROVED POSITIVE BATTERY PLATE, the disclosure of which is expressly incorporated herein by reference. The glass fiber can be monofilament or multifilament strands and in the form of roving, chopped fiber, glass wool or woven or non-woven fabric. The glass powder can be sintered into a solid sheet having a porosity from about 60 to about 95%. Stannic oxide has a conductivity several times that of graphite. $SnO_2$ (doped) has a conductivity of 300 to 400 micro-ohm-cm vs. 1375 micro-ohm-cm for graphite.

Stannic oxide is thermodynamically stable to the oxidation/reduction potential in the electrochemical environment of the positive electrode of a lead-acid battery, has about the same resistivity as $PbO_2$ when $SnO_2$ is properly doped with a suitable dopant such as a fluoride ion or an antimony ion, and refractory or baked type of $SnO_2$ is quite insoluble in sulfuric acid. The stannic acid conductivity additive will remain unchanged during the course of charge and discharge of the positive plate.

The coating of stannic oxide onto glass to form conductive coating (The $SnO_2$ must be doped, e.g. Sb ion or F ion dopants.) was developed over 30 years ago and has been widely practiced to defrost windshields in aircraft and automobiles. The conductive coating is applied to heated glass fiber, powder, fabric, sintered sheet or glass wool from a solution of stannic chloride in hydrochloric acid as disclosed in U.S. Pat. No. 2,564,707, the disclosure of which is expressly incorporated herein by reference. The solution can be sprayed onto glass fibers heated to a temperature above 500° C., usually at about 700° C. Continuous forms of glass such as filaments, yarn, fabric, or sintered sheets can also be coated with a conductive tin oxide layer.

The diameter of the glass fibers is preferably very small such as from about 1 to about 20 microns. Very fine fibers are too hard to handle and large diameter fibers have too small a surface to provide adequate conductive surface. The fibers preferably contain a conductive coating of stannic oxide ranging in thickness from 0.01 micron to about 10 microns, more preferably from about 0.05 micron to about 5 microns.

Referring now to FIG. 1, a unitary, monopolar battery plate 10 is illustrated. The plate 10 comprises a sheet 12 of woven fiberglass, the strands 14 of which contain a coating 16 of conductive tin oxide. The lower portion of the fiberglass sheet 12 contains a layer 18 of synthetic organic resin forming a fluid-impervious, through-conductive substrate. The upper portion contains lead dioxide forming a positive active electrode layer 20. The particles 22 of lead dioxide are in contact with the strands 14 which form a conduction path from front surface 24 to rear surface 26.

The thickness of the resin layer 12 is usually from about 1 to about 20 mils, more preferably from about 4 to about 10 mils. The synthetic organic resin can be a thermoplastic or a thermosetting resin. Representative thermosetting resins are epoxies and polyesters. Preferred thermoplastics are the polyolefins such as ethylene or polypropylene. Polypropylene (pp) is the resin of choice since it has demonstrated long-term stability in lead-acid battery applications. The conductive filler is present in an amount sufficient to provide adequate conductivity. The resin layer preferably contains at least about 0.5% to about 20% by weight of tin oxide, or about 20% to about 80% by weight of tin oxide coated glass fibers or particles.

A composition for the resin composite layer follows:

| For 100 vols. (cm³, e.g.) of composite | | | |
|---|---|---|---|
| $V_{pp}$ | = 88 cm³ | $W_{pp}$ | = 79 gm. |
| $V_{glass}$ | = 10 cm³ | $W_{resin\ glass}$ | = 25 gm. |
| $V_{SnO_2}$ | = 2 cm³ | $W_{SnO_2}$ | = 14 gm |
| $V_t$ | = 100 cm³ | $W_t$ | = 118 gm. |

| -continued |
|---|
| For 100 vols. (cm³, e.g.) of composite |

$$\text{Wt. percent } SnO_2 = \frac{14}{118} = 12\% \text{ and}$$

$$\text{vol. percent coated fibers} = \frac{10 + 2}{100} = 12\%.$$

The positive active paste is prepared according to methods well established in the art. The lead dioxide can be dispersed in water to form a paste and impregnated into the upper layer of conductive, coated fiberglass and dried, or a precursor paste of lead sulfate and litharge (PbO) such as one containing 75% lead sulfate and 25% litharge in water can be worked into the pores of the fiberglass and dried and cured. The paste is converted to lead dioxide by applying a charging potential to the paste.

Figure 2:
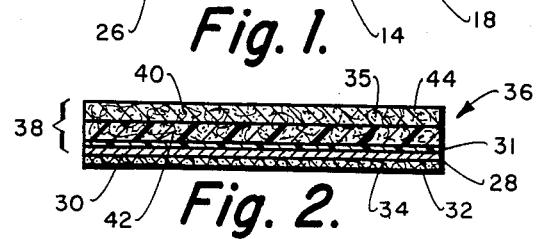
FIG. 2 is a view in section of a bipolar battery electrode assembly prepared according to the invention.

Referring now to FIG. 2, since tin oxide is not stable in the reducing environment of a negative electrode, the surface 28 facing the negative electrode should contain a layer 30 that is conductive and stable under reducing conditions. The layer 30 can also be a thin film or foil of lead preferably having a thickness from about 0.5 to about 10 mils, more preferably from about 1 to about 5 mils. The layer 30 can be adhered to the plate 10 by a conductive adhesive such as a film 31 of graphite-filled epoxy adhesive. Electrical contact is improved by applying an electrical current to the foil to slightly melt the foil so that it flows and forms a better contact with the tin oxide coated glass fibers. The fabrication of the bipolar plate is completed by depositing a layer 32 of negative active material such as lead paste onto the layer 30 supported by a sheet 34 of glass scrim.

The plate 36 is illustrated in FIG. 2 and utilizes a sheet 38 of porous, sintered glass containing a conductive coating 40 of tin oxide on the surfaces of the continuous open pore structure. The lower position of the sheet 38 is impregnated with a resin to form a fluid-impervious layer 42 and the upper layer 44 is impregnated with electrochemically active materials, such as particles 35 of lead oxide.

Figure 3:
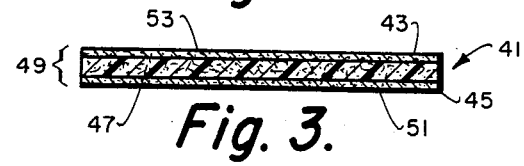
FIG. 3 is a view in section of a monopolar battery electrode.

Referring now to FIG. 3, a monopolar plate 41 having like polarity layers 43, 45 on both surfaces of the central, liquid-impervious resin layer 47 is illustrated in FIG. 3. The plate 41 contains a sheet of tin oxide coated sintered glass 49 extending from the top surface 53 to the bottom surface 51. The plate 41 can be formed by impregnating the sheet of tin oxide coated, sintered glass with a soluble binder such as polypropylene. The front and back surfaces are then etched to remove resin sufficient to form an electrode paste receiving layer 43, 45 which are then filled with paste and cured.

Figure 4:
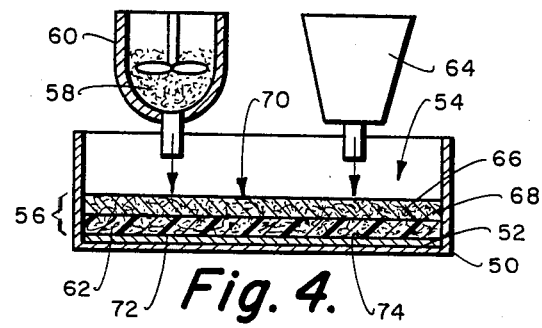
FIG. 4 is a schematic view of a first method for forming a battery electrode.

The battery plate of the invention can be readily fabricated by casting or roll molding techniques. Referring now to FIG. 4, the plate can be fabricated by placing a sheet 50 of lead foil on the bottom surface 52 of the casting cavity 54. A sheet 56 of compressed glass wool is placed on top of the sheet 50 of lead. Molten resin 58 from mixing kettle 60 is then poured into the cavity. After the resin cools, a conductive layer 62 attached to the lead foil 50 is formed. Positive active paste from hopper 64 is then poured into the cavity 54 and fills into the pores 66 of the glass gool in the upper layer 68. The paste is dried. A potential can then be applied to plate assembly 70 to convert the paste to lead dioxide and to provide better electrical contact to the fiber ends 72 in contact with the inner surface 74 of the lead foil.

Figure 5:
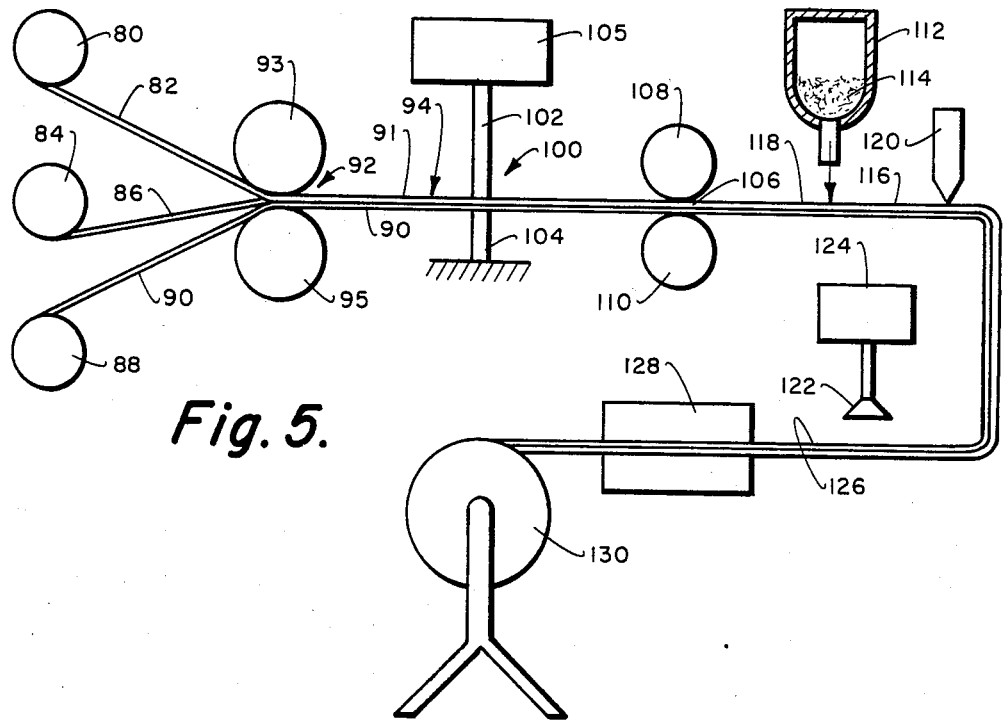
FIG. 5 is a schematic view of another method for forming battery electrodes according to the invention.

Referring now to FIG. 5, another apparatus for forming a conductive plate includes a supply roll 80 of a thermoplastic resin 82 such as polypropylene having a thickness of about 0.010 inches, a supply roll 84 of tin oxide coated sintered glass 86 having a porosity of 85% to 90% and a thickness of 0.035 inches to 0.090 inches, and a supply roll 88 of lead foil 90 having a thickness from about 0.001 to 0.002 inches. The surface of the foil may optionally be coated with a layer of a heat curable, conductive adhesive such as an epoxy filled with graphite fibers and/or powder. The lead foil can be precoated onto the lower surface of the sheet of resin and roll 88 can then be eliminated. The sheet 86 of sintered glass has a thickness greater than that of the sheet of polypropylene. When the three sheets are drawn through the nip 92 of the heated rollers 93, 95, the sheet 82 of polypropylene softens. The rollers heat the assembly above the melting point of polypropylene but below the melting point of lead, while applying a light pressure to the assembly. The sheet 86 of sintered glass is pressed into the softened resin to form a composite layer. The sheet 90 of lead foil simultaneously attaches to the sheet 86 to form a laminate 94. The lead foil is in firm contact with the sheet of sintered glass.

The electrical contact of the lead foil with the sintered glass can be enhanced in station 100. The assembly 98 is subjected to an electric current in station 100 by means of electrodes 102, 104. Powered by supply means 105, the travel of the laminated assembly 94 is intermittently stopped; electrodes 102, 104 are placed in contact with the assembly 94 and power control 105 is actuated to apply a current to the sheet assembly 94 which slightly melts the lead at the points of contact with the conductive fibers or porous, sintered glass. The assembly may then be passed through the nip 106 of cooling rollers 108, 110. The assembly 91 then passes under hopper 112 and receives a flow of particles of dry, lead oxide 114 which fill into the pores 116 of the upper layer 118. After the assembly passes past doctor blade 120, the sheet passes under spray head 122 which applies a spray of dilute sulfuric acid from tank 124 to the layer 126 of paste. The sheet assembly 94 is then pulled through a heating oven 128 which cures the paste before windup on windup stand 130.

The following experiments were conducted to evaluate the performance of thin films of stannic oxide in the environment of a lead-acid battery.

EXAMPLE 1

Glass plates were coated with a conductive coating of stannic oxide following the procedure of U.S. Pat. No. 2,564,707.

The stannic oxide coated glass plates of Example 1 were immersed in 5.3M $H_2SO_4$ at both 20° C. and 50° C. The plates were withdrawn periodically and the resistance of the thin film coating was measured. The results of measurements during 33 days are shown in Table 1.

TABLE I

Chemical Corrosion of Stannic Oxide Thin Film in 5.301 M $H_2SO_4$

| TIME (DAYS) | 50° C. ELECTRODE RESISTANCE Ω (20° C.) | 20° C. ELECTRODE RESISTANCE Ω (20° C.) |
|---|---|---|
| 0 | 10.95 | 10.84 |
| 1 | 10.94 | 10.84 |
| 8 | 10.95 | 10.84 |
| 16 | 10.94 | 10.84 |
| 20 | 10.94 | 10.83 |
| 26 | 10.93 | 10.82 |
| 30 | 10.93 | 10.81 |
| 33 | 10.93 | 10.81 |

During that time at both temperatures listed, the resistance change was less than 1/1000 of the film's original condition (day=0). The two samples described in the Table started with different resistance values for the reason that the plates do not have identical dimensions.

Electrochemical corrosion tests were run utilizing a PARC potentiostat, Model 173, to apply a constant potential to either the cathode or anode in the electrochemical cell. This was done by setting the potential of one of the electodes relative to a saturated calomel reference electrode (SCE). Two tests were run simultaneously in separate cells. One case corresponded to the SOTF used as an anode (positive terminal) with a fixed potential. The counter electrode was a Pt foil. The second case has the SOTF situated as the cathode, again using the Pt foil as the counter electrode.

Shown in Table 2 is the data for ten days of electrochemical tests using SOTF as the anode.

TABLE 2

Potentiostatic Corrosion of Stannic Oxide Thin Film
Anode potential = 1.058 V vs S C E
Platinum cathode in 5.301 M $H_2SO_4$ at 22° C.

| TIME (DAYS) | RESISTANCE (20° C.) |
|---|---|
| 0 | 8.12 |
| 2 | 8.11 |
| 7 | 8.11 |
| 10 | 8.12 |

With a potential of +1.06 V relative to a calomel electrode, the stannic oxide film did not show a change in resistance within the measurement uncertainty of the experimental apparatus.

The results of using the stannic oxide film as the cathode in the electrochemical cell are shown in Tables 3, 4 and 5.

TABLE 3

Potentiostatic Corrosion of Stannic Oxide Thin Film
Cathodic potential = 0.695 V vs S C E
Platinum anode in 5.301 M $H_2SO_4$ at room temperature

| TIME (HOURS) | RESISTANCE (20° C.) | $R_T/R_o$ |
|---|---|---|
| 0 | 7.85 | 1.00 |
| ½ | 10.65 | 1.35 |
| 1½ | 16.53 | 2.10 |

TABLE 4

Potentiostatic Corrosion of Stannic Oxide Thin Film
Cathodic potential = 0.1 V vs S C E
Platinum anode in 5.301 M $H_2SO_4$ at room temperature

| TIME (HOURS) | RESISTANCE Ω (20° C.) | $R_T/R_o$ |
|---|---|---|
| 0 | 7.745 | 1.000 |

TABLE 4-continued

Potentiostatic Corrosion of Stannic Oxide Thin Film
Cathodic potential = 0.1 V vs S C E
Platinum anode in 5.301 M $H_2SO_4$ at room temperature

| TIME (HOURS) | RESISTANCE Ω (20° C.) | $R_T/R_o$ |
|---|---|---|
| 66 | 7.756 | 1.001 |
| 90 | 7.754 | 1.001 |
| 130 | 7.753 | 1.001 |

TABLE 5

Potentiostatic Corrosion of Stannic Oxide Thin Film
Cathodic potential = 0.350 V vs S C E
Platinum anode in 5.301 M $H_2SO_4$ at room temperature

| TIME (HOURS) | RESISTANCE Ω (20° C.) | $R_T/R_o$ |
|---|---|---|
| 0 | 7.599 | 1.000 |
| ½ | 7.622 | 1.003 |
| 1 | 7.641 | 1.005 |
| 2 | 7.667 | 1.009 |
| 3 | 7.678 | 1.010 |
| 5 | 7.868 | 1.011 |
| 7 | 7.696 | 1.012 |
| 24 | 7.863 | 1.034 |
| 30 | 7.933 | 1.043 |
| 95 | 9.589 | 1.261 |
| 115 | 9.981 | 1.313 |
| 163 | 10.873 | 1.430 |

It was found that significant deterioration occurs at both −0.70 V and −0.35 V. Reducing the potential to −0.10 V stopped the electrochemcial corrosion. Over a five day period, there was no measureable change in film resistance.

After 33 days of conducting chemical corrosion testing, using electrical resistance as the criteria, less than 1/1000 change was detected in the measurements, i.e., the standard deviation is less than 1/1000. Since the error bar in the measurement may be a maximum of 2/1000, a conservative approach to extrapolating the data is to assume an increase of 2/1000 in the film resistance every 30 days. At this rate of degradation, the SOTF (stannic oxide thin film) would take 20 years to double the initial electrical resistance.

The electrochemical corrosion resistance of the SOTF was determined in an electrochemical cell using the SOTF as either the positive or negative electrode and with Pt foil as the counter electrode. The cell was set up with a saturated calomel reference electrode (SCE) which was used to fix the potential of the SOTF electrode. As before, 5.3M sulfuric acid was used and all electrochemical tests were run at 20° C. The SOTF electrode (coated glass plate) was removed periodically from the electrochemical cell and measurements were made of films. Using the SOTF as the anode (positive electrode with a potential of +1.06 versus SCE), less than 1/1000 change in electrical resistance was measured after 10 days of continuous running. Given this limited data, it would take approximately seven years for the SOTF to double the initial resistance value.

Another series of experiments were run using SOTF as the cathode (negative electrode) and Pt foil as the anode at 20° C. Initial runs, where the SOTF potential was set to −1.2 V relative to a SCE reference electrode, resulted in a complete degradation or corrosion of the thin film within a time frame of five to ten minutes. Running the electrochemical cell with SOTF at −0.70 V versus SCE and −0.35 V versus SCE resulted in a significant increase in film electrical resistance with time. For the case of 0.70 V, the resistance doubled with a time of 1 hour while for −0.35 V the time for doubling of resistance is estimated to be 14 days. Reducing the SOTF potential further to −0.10 V versus SCE resulted in no noticeable resistance change during five days. Consequently, the threshold potential for degradation of SOTF appears to be between −0.10 V and −0.35 V versus SCE. Polarity reversal below −0.10 V should be avoided.

The battery plate of the invention has application in any stacked electrochemical cell in which it is desired to provide conduction to an adjacent electrode or an adjacent cell. The plate can be used in batteries, electrolysis cells, fuel cells, electrophoresis cells, etc. The plate can be used in cells with vertically or horizontally disposed cells. The preferred cell configuration is horizontal since horizontal disposition of a cell prevents electrolyte stratification and the continuous, flat surface of the battery plate of the invention will prevent shedding of active electrode material, the most prominent failure mode for lead-acid cells.

A particular efficient horizontal battery configuration is disclosed in my copending application, Ser. No. 279,841, filed July 2, 1981, entitled BIPOLAR SEPARATE CELL BATTERY FOR HIGH OR LOW VOLTAGE, the disclosure of which is expressly incorporated herein by reference. In that application, bipolar plate groupings are placed between monopolar plates to increase available potential voltage. The conductive plate of the invention can be utilized as a substrate to form either the bipolar plate or monopolar plate of such a battery. A monopolar plate will differ in having the same polarity material provided on each surface thereof, and means to provide lateral conduction to provide for parallel connection of cell groupings.

The bipolar groupings can be interspersed with monopolar plates connected by bus bars to battery terminals. Bipolar groupings are formed simply by interspersing a porous electrolyte-separator plate between the active material coated bipolar plates. The active materials can also be formed in situ according to the state of the art by applying lead to each surface and then placing the electrode materials in electrolyte and connecting them to a source of potential.

It is to be unierstood that only preferred embodiments of the invention have been described and that numerous substitutions, modifications and alterations are permissible without departing from the spirit and scope of the invention as defined in the following claims.

We claim:

1. A plate for a lead-acid battery comprising:
   a porous body formed of a substrate having a surface layer of conductive tin oxide that is thermodynamically stable during charge and discharge of said battery;
   a first layer of matrix resin impregnated into the pores of the body to form a conductive, fluid impervious, first layer;
   a second layer adjacent to the first layer containing electrochemically active lead oxide material in the pores of the body.

2. A plate according to claim 1, in which the substrate is glass.

3. A plate according to claim 2, in which the tin oxide is coated onto a particulate substrate.

4. A plate according to claim 2, in which the substrate is in the form of powder, filaments, fibers or a sintered porous sheet.

5. A plate according to claim 4, in which the substrate is a glass fiber having a diameter from about 1 to about 20 microns.

6. A plate according to claim 5, in which the tin oxide layer has a thickness from 0.01 micron to about 10 microns.

7. A plate according to claim 6, in which the coated fibers are present in the matrix resin layer in an amount from about 20% to about 80% by weight.

8. A plate according to claim 7, in which the fibers are in the form of a sheet of glass wool.

9. A plate according to claim 7, in which the fibers are in the form of a woven fabric.

10. A plate according to claim 7, in which the resin is a polyolefin.

11. A plate according to claim 10, in which the resin is polypropylene.

12. A plate according to claim 1, in which the first layer has a thickness from about 1 to about 20 mils.

13. A plate according to claim 1, in which the pores of the second layer contains lead oxide paste.

14. A plate according to claim 1, further including a third fluid-impervious conductive layer that is resistent to reduction applied to the surface of the first layer.

15. A plate according to claim 14, further including a negative electrode applied to the third layer.

16. A plate according to claim 15, in which the conductive layer is selected from thin films of metal and a film or resin containing a dispersion of conductive particles.

17. A plate according to claim 16, in which the particles are fibers selected from lead or graphite.

18. A plate according to claim 14 in which the negative electrode includes a negative active paste containing lead associated with the third layer.

* * * * *